United States Patent [19]
Smith et al.

[11] Patent Number: 4,780,876
[45] Date of Patent: Oct. 25, 1988

[54] METHOD AND APPARATUS FOR GENERATING COHERENT RADIATION

[75] Inventors: David W. Smith; David Cotter, both of Woodbridge; Richard Wyatt, Martlesham, all of England

[73] Assignee: British Telecommunications Public Limited Company, United Kingdom

[21] Appl. No.: 2,717
[22] PCT Filed: May 9, 1986
[86] PCT No.: PCT/GB86/00253
 § 371 Date: Jan. 5, 1987
 § 102(e) Date: Jan. 5, 1987
[87] PCT Pub. No.: WO86/06885
 PCT Pub. Date: Nov. 20, 1986

[30] Foreign Application Priority Data

May 9, 1985 [GB] United Kingdom ............... 8511690

[51] Int. Cl.$^4$ .................................................. H01S 3/30
[52] U.S. Cl. .................................... 372/3; 372/6; 372/94; 350/96.13; 350/96.15
[58] Field of Search .................... 378/6, 3, 94; 350/96.13, 96.15

[56] References Cited

U.S. PATENT DOCUMENTS 4,107,628 8/1978 Hill et al. ........................... 372/21
4,530,097 7/1985 Stokes et al. ........................ 372/6

OTHER PUBLICATIONS

Light Signal Amplifier, vol. 6, No. 22, (P-101), Feb. 9, 1982, Nippon Deshin Denwa Kosha (72) Sunao Uesugi(1)-1 page.

"All-Fiber Stimulated Brillouin Ring Laser with Submissiwatt Pump Threshold", by L. F. Stokes et al.-vol. 7, (1982), Oct., No. 10, New York, USA Optics Letters, pp. 509-511.

"Raman Amplification of Recirculating Pulses in a Reentrant Fiber Loop", by E. Desurvire et al., Optics Letters, vol. 10, No. 2, Feb. 1985, Optical Society of America, pp. 83-85.

"Stimulated Brillouin Scattering in Monomode Optical Fibre", Journal of Optical Communications 4(1983), 1, 10-19, D. Cotter.

Primary Examiner—Leon Scott, Jr.
Attorney, Agent, or Firm—Nixon & Vanderhye

[57] ABSTRACT

A method and apparatus for generating relatively narrow linewidth radiation, for example having a 1 MHz linewidth. The apparatus comprises a source of relatively broad linewidth, coherent radiation such as a semiconductor laser (1) generating optical radiation having a linewidth of 10 MHz. The broad linewidth radiation is injected into a waveguide ring (5), the characteristics of the radiation and the form of the waveguide ring (5) being such that stimulated Brillouin scattering occurs in use to generate the relatively narrow linewidth of the order of kHz, coherent wave travelling in an opposite direction to the broad linewidth radiation. A directional coupler (3) between the source (1) and the waveguide ring (5) separates the narrow linewidth wave from the injected radiation.

9 Claims, 1 Drawing Sheet

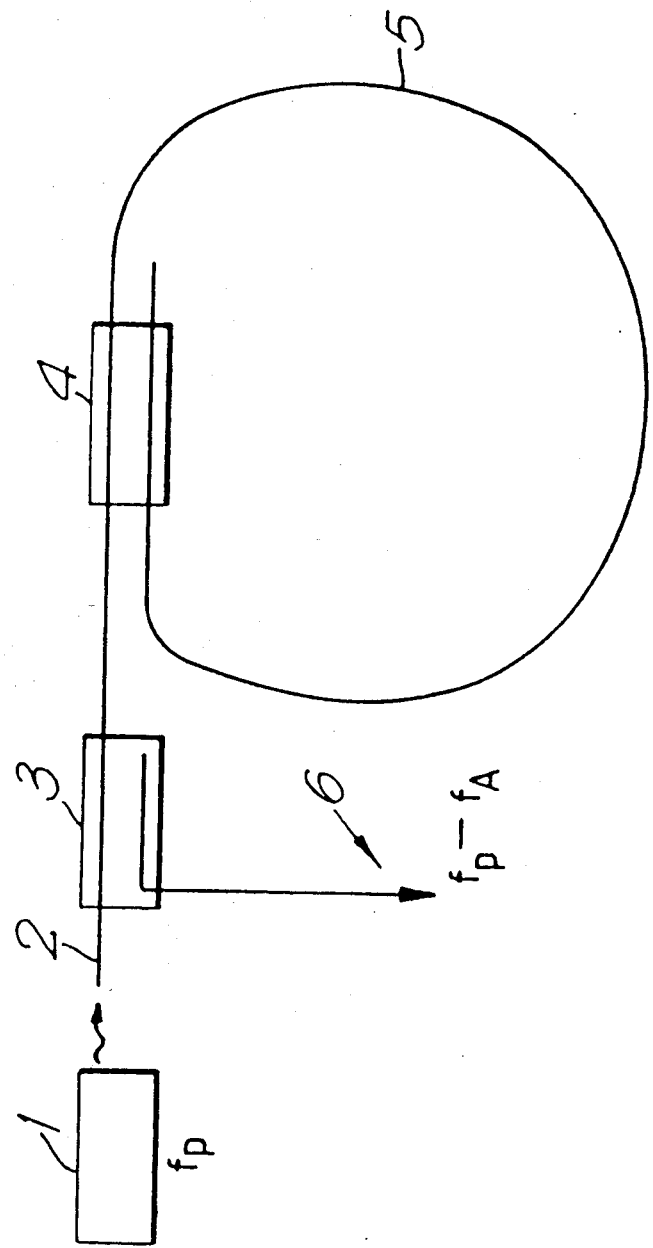

METHOD AND APPARATUS FOR GENERATING COHERENT RADIATION

RELATED APPLICATIONS

This application is related to my copending U.S. application No. 2,694 filed Jan. 5, 1987.

BACKGROUND OF THE INVENTION

The invention relates to methods and apparatus for generating coherent radiation, for example optical radiation.

There have been many proposals in the past for methods and apparatus for generating coherent radiation, in particular lasers. There is now a requirement for the generation of relatively narrow linewidth coherent radiation and to achieve this it has been necessary to construct highly accurate and therefore expensive radiation sources.

SUMMARY OF THE INVENTION

In accordance with one aspect of the present invention, apparatus for generating coherent radiation comprises a source of coherent radiation having a relatively broad linewidth; a waveguide ring into which radiation from the source is injected, the radiation generated by the source and the form of the waveguide ring being such that the radiation is scattered in use to generate a relatively narrow linewidth, coherent wave travelling in an opposite direction to the broad linewidth radiation; and separation means for separating the narrow linewidth wave from the injected radiation.

In accordance with a second aspect of the present invention, a method of generating relatively narrow linewidth radiation comprises injecting relatively broad linewidth radiation into a waveguide ring, the characteristics of the relatively broad linewidth radiation and the form of the waveguide ring being such that the radiation is scattered to generate a relatively narrow linewidth, coherent wave travelling in an opposite direction to the broad linewidth radiation; and separating the narrow linewidth wave from the injected radiation.

The invention is based on the use of resonance phenomena such as stimulated Brillouin scattering (SBS) and Raman scattering which until now have been considered a limitation on the transmission of radiation through waveguides. These effects are particularly apparent in the transmission of optical wavelengths through dielectric waveguides and occur in low loss optical fibres if narrow linewidth laser light of above a certain power level threshold is injected. SBS is preferable to Raman scattering because much lower pump powers are required.

The principle of SBS will now be described in connection with optical radiation. SBS can be described essentially as a coupled three-wave interaction involving the incident light wave (pump), a generated acoustic wave, and the scattered light wave (Stokes). The pump creates a pressure wave in the medium due to electrostriction and the resultant variation in density changes the optical susceptibility. Thus the incident light wave pumps the acoustic wave which scatters it and the scattering creates the Stokes wave.

The three waves obey the energy conservation law which relates the three frequencies by:

$$f_A = f_L - f_S$$

where the subscripts L, S, A refer to the laser (pump), Stokes and acoustic frequencies respectively. Maximum power transfer occurs when the wave-vector mismatch is zero:

$$k_A = k_L - k_S$$

There are two important consequences of these two equations. Firstly, the Stokes wave experiences maximum gain when the pump and Stokes wave vectors are parallel and counter-directional. Thus in a monomode fibre SBS generates a backward-travelling Stokes wave. Secondly, the Stokes wave is shifted to a lower frequency with respect to the pump by an amount equal to the acoustic frequency.

Stimulated Brillouin scattering is most apparent for narrow linewidth coherent waves. The invention makes use of this property by generating a narrow linewidth wave from relatively broad linewidth radiation. It is comparatively straight forward to generate broad linewidth radiation using for example single mode diode lasers such as distributive feedback (DFB) lasers.

As has been mentioned above, the narrow linewidth wave will be frequency shifted from the central wave length of the broad linewidth radiation. Typically, the broad linewidth radiation may have a linewidth between 1 MHz and 100 MHz, for example 10 MHz while the narrow linewidth radiation will have a linewidth less than 1 MHz typically of the order of kHz.

The characteristics of the broad linewidth radiation and the form of the waveguide ring must be such that scattering occurs. In general, scattering depends on the wavelength and power of the broad linewidth radiation and the refractive index of the medium forming the waveguide ring.

The narrow linewidth wave is similar to that which could be obtained by external cavity diode or gas lasers but is achieved from potentially much more robust apparatus.

Preferably, the radiation is optical radiation. In this specification, the term optical is intended to refer to that part of the electro-magnetic spectrum which is generally known as the visible region together with those parts of the infra-red and ultra-violet regions at each end of the visible region which are capable of being transmitted by dielectric optical waveguides such as optical fibres. Typically the radiation has a wavelength in the range 0.5 $\mu$m-10 $\mu$m.

The separation means may be provided by a directional coupler or an optical circulator such as a Faraday rotator positioned between the source of coherent radiation and the waveguide ring whereby the broad linewidth radiation passes through the coupler to the ring along a first path and the narrow linewidth wave is diverted away from the first path to an output port.

BRIEF DESCRIPTION OF THE DRAWINGS

An example of a method and apparatus for generating relatively narrow linewidth radiation will now be described with reference to the accompanying drawing which is a schematic block diagram of the apparatus.

DETAILED DESCRIPTION OF AN EXEMPLARY EMBODIMENT

The apparatus comprises a DFB semiconductor laser 1 which generates an optical continuous wave having a relatively broad linewidth of 10 MHz. This may be centred for example on a wavelength lying between 0.63 μm and 1.65 μm and have a power as low as 0.56 mW. This broad linewidth optical wave is guided along the first path 2 to a directional coupler 3 of conventional form. The radiation passes from the directional coupler 3 via another optical coupler 4 into an optical fibre ring 5. The optical fibre ring 5 is formed from a length of monomode optical fibre, for example ten metres long. This is described in more detail in an article by L. F. Stokes et al in Optics Lett 7 (1982) pp 509-511.

Providing the injected optical wave has sufficient power, stimulated Brillouin scattering will take place resulting in the generation of a Stokes wave having a wave vector parallel with, but in an opposite direction to the injected radiation. This Stokes wave passes out of the fibre ring 5 along the first path 2 to the directional coupler 3. Since the Stokes wave is flowing in an opposite direction to the injected radiation it will be separated from the first path 2 by the directional coupler 3 and guided to an output port 6.

The Stokes wave inherently has a narrower linewidth, less than 1 MHz, than the original radiation and is also shifted in frequency by an amount $f_A$. This frequency shift is given by the formula:

$$f_A = 2v_A n \lambda.$$

where
$V_A$ is the acoustic velocity in the fibre ring,
n is the refractive index of the fibre ring, and
λ is the optical wavelength.

In the case where the ring 5 is made from fused silica, a frequency shift of about 11.1 GHz will occur.

This frequency shift is independent of the frequency ($f_p$) of the pump 1 and thus the frequency of the narrow linewidth wave can be selected simply by tuning the pump frequency. Furthermore, the frequency shift is temperature and environment independant.

It should be noted that the existence of the frequency shift automatically avoids power reflection problems and removes any necessity for isolators.

We claim:

1. Apparatus for generating coherent radiation, the apparatus comprising:
    a source of coherent radiation having a relatively broad linewidth;
    an optical waveguide ring into which radiation from the source is injected, the radiation generated by the source and injected into the optical waveguide ring being scattered to generate a relatively narrow linewidth, coherent wave travelling in an opposite direction to the injected broad linewidth radiation; and
    separation means for separating the narrow linewidth wave from the injected radiation.

2. Apparatus according to claim 1, wherein the radiation comprises optical radiation.

3. Apparatus according to claim 1 or claim 2, wherein the separation means comprises:
    a directional coupler positioned between the source of radiation and the optical waveguide ring and the relatively broad linewidth radiation is guided by said directional coupler to the ring along a first path while the relatively narrow linewidth wave is separated from the first path by said directional coupler and guided to an output port.

4. Apparatus according to claim 1 or claim 2 wherein the radiation generated by the source and the form of the optical waveguide ring causes Brillouin scattering to occur.

5. A method of generating relatively narrow linewidth radiation, the method comprising:
    injecting coherent radiation having a relatively broad linewidth into a waveguide ring such that the radiation is scattered to generate a relatively narrow linewidth, coherent wave travelling in an opposite direction to the broad linewidth radiation; and
    separating the narrow linewidth wave from the injected radiation.

6. A method according to claim 5, wherein the radiation comprises optical radiation.

7. A method according to claim 6 or claim 5, wherein the scattered radiation is scattered by stimulated Brillouin scattering.

8. Apparatus for generating coherent radiation having a relatively narrow linewidth of substantially less than 1 MHz, said apparatus comprising:
    an optical waveguide ring including a waveguide means coupled back onto itself via a first optical waveguide coupler;
    a radiation source providing radiation having a relatively wide linewidth of substantially more than 1 MHz connected to said first waveguide coupler to inject sufficient said wide linewidth radiation into said waveguide ring to cause in said waveguide ring a scattered backward traveling wave having relatively narrow linewidth of substantially less than 1 MHz; and
    a directional waveguide coupler connected to selectively couple said backward traveling wave of narrow linewidth radiation to an output port.

9. Apparatus as in claim 8 wherein said source is connected to said first waveguide coupler via a waveguide segment disposed outside the waveguide ring and coupled to said directional waveguide coupler whereby the backward traveling wave passes out of the ring through said first waveguide coupler but is selectively coupled away from the source of said directional coupler

* * * * *